US010519064B2

(12) United States Patent
Willimann et al.

(10) Patent No.: US 10,519,064 B2
(45) Date of Patent: Dec. 31, 2019

(54) PROCESS AND ADDITIVE TO IMPROVE ADHESION OF BUILDING COMPOSITIONS TO SUBSTRATES

(71) Applicant: NOURYON CHEMICALS INTERNATIONAL B.V., Arnhem (NL)

(72) Inventors: Hongli Willimann, Zug (CH); Robert Koelliker, Oberkirch (CH); Andrey Petrovich Pustovgar, Moscow (RU); Hans Wicki, Malters (CH); Urs Heini, Neuenkirch (CH); Thomas Aberle, Nottwil (CH)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 494 days.

(21) Appl. No.: 15/080,083

(22) Filed: Mar. 24, 2016

(65) Prior Publication Data

US 2016/0200631 A1 Jul. 14, 2016

Related U.S. Application Data

(63) Continuation of application No. 13/515,347, filed as application No. PCT/EP2010/069690 on Dec. 15, 2010, now abandoned.

(60) Provisional application No. 61/292,283, filed on Jan. 5, 2010.

(30) Foreign Application Priority Data

Dec. 18, 2009 (EP) .................................... 09180024

(51) Int. Cl.
| B05D 7/02 | (2006.01) |
| C04B 16/02 | (2006.01) |
| E04F 15/00 | (2006.01) |
| C04B 20/10 | (2006.01) |
| C04B 28/04 | (2006.01) |
| C04B 40/00 | (2006.01) |
| C09D 5/34 | (2006.01) |
| C04B 111/00 | (2006.01) |

(52) U.S. Cl.
CPC .............. *C04B 16/02* (2013.01); *B05D 7/02* (2013.01); *C04B 20/1022* (2013.01); *C04B 28/04* (2013.01); *C04B 40/0039* (2013.01); *C04B 40/0042* (2013.01); *C09D 5/34* (2013.01); *E04F 15/00* (2013.01); *C04B 2111/00637* (2013.01); *C04B 2111/00672* (2013.01); *Y02W 30/94* (2015.05)

(58) Field of Classification Search
CPC ............ C04B 16/02; B05D 7/02; E04F 15/00
See application file for complete search history.

(56) References Cited

U.S. PATENT DOCUMENTS

| 3,272,765 A * | 9/1966 | Sefton ...................... C04B 28/04 |
| | | 521/54 |
| 3,830,762 A | 8/1974 | Abbott |
| 3,847,630 A | 11/1974 | Compernass et al. |
| 5,959,017 A | 9/1999 | Eck et al. |
| 6,350,808 B1 | 2/2002 | Schmitz et al. |
| 2002/0045692 A1 | 4/2002 | Fiedler et al. |
| 2005/0014881 A1 | 1/2005 | Weitzel et al. |
| 2005/0221991 A1 | 10/2005 | Wolf et al. |
| 2007/0256600 A1* | 11/2007 | Hedouin ................. C04B 28/02 |
| | | 106/696 |
| 2009/0092840 A1 | 4/2009 | Schlumpf et al. |
| 2009/0223416 A1 | 9/2009 | Aberle et al. |
| 2010/0234490 A1 | 9/2010 | Gäberlein et al. |
| 2011/0265693 A1 | 11/2011 | Hoetzl et al. |
| 2012/0097076 A1 | 4/2012 | Stohr et al. |
| 2014/0113078 A1 | 4/2014 | Aberle et al. |
| 2014/0121302 A1* | 5/2014 | Brien .................... C04B 28/065 |
| | | 524/5 |
| 2014/0135428 A1* | 5/2014 | Klein .................... C08F 220/18 |
| | | 524/5 |

FOREIGN PATENT DOCUMENTS

| CA | 2198773 A1 | 3/1996 |
| CN | 101244913 A | 8/2008 |
| CN | 101268028 A | 9/2008 |
| CN | 101759392 A | 6/2010 |
| DE | 199 01 307 C1 | 6/2000 |
| DE | 101 36 456 A1 | 2/2003 |
| EP | 0 765 899 A1 | 4/1997 |
| EP | 0 897 965 A2 | 2/1999 |
| EP | 1 193 287 A2 | 4/2002 |
| EP | 1 498 446 A1 | 1/2005 |
| EP | 1 860 131 A1 | 11/2007 |
| EP | 2 246 403 A1 | 11/2010 |
| JP | 2000-314092 A | 11/2000 |
| RU | 2 204 540 C1 | 5/2003 |
| WO | 2005/054391 A2 | 6/2005 |

(Continued)

OTHER PUBLICATIONS

European Search Report for Application No. EP 09 18 0024 dated May 31, 2010.

(Continued)

Primary Examiner — Nathan H Empie
(74) Attorney, Agent, or Firm — Lorenz & Kopf, LLP

(57) ABSTRACT

The present invention relates to the use of an additive as well as a process to improve the adhesion of a mortar to a building substrate, wherein the mortar is mixed with said additive and is applied to a building substrate selected from the group of polystyrene-containing substrates, polyolefin-containing substrates or polyvinyl chloride-containing substrates, the additive containing (i) a plasticizer that is liquid at 50° C. or lower, has a boiling point of 100° C. or higher, and that has a solubility parameter δ 25° C. between 22.5 $MPa^{1/2}$ and $MPa^{1/2}$; (ii) optionally, a filler that has a BET surface area of at least 40 $m^2/g$; (iii) optionally, a biopolymer, (iv) optionally, a protective colloid; and (v) optionally, a water-insoluble film-forming (co)polymer based on ethylenically unsaturated monomers. The invention also covers an additive and a kit of parts suitable for use in the above process.

19 Claims, No Drawings

(56) References Cited

FOREIGN PATENT DOCUMENTS

| WO | 2007/017286 A1 | 2/2007 |
|---|---|---|
| WO | 2007/036324 A1 | 4/2007 |
| WO | WO 2010/060659 A1 | 6/2010 |
| WO | WO 2010/119017 A1 | 10/2010 |
| WO | 2011/073224 A2 | 6/2011 |

OTHER PUBLICATIONS

International Search Report with Written Opinion for International Application No. PCT/EP2010/069690 dated Jun. 16, 2011.

EP 0 897 965 A2 English language machine translation (Publication Date Feb. 24, 1999).

Banu et al., "Contributions to Characterization of Poly(vinyl chloride)—Lignin Blends," Journal Applied Polymer Science, vol. 101 (2006) pp. 2732-2748.

Barton, Allan F. M., "CRC Handbook of Solubility Parameters and Other Cohesion Parameters," CRC Press, 2nd Edition (1991) pp. 122-139.

Brandrup et al., "Polymer Handbook—Solubility Parameter Tables," John Wiley & Sons, vol. VII (1999) pp. 688-701.

Wang et al., "Morphology, mechanical properties, and durability of poly . . . 1,2-dicarboxylate," Polymer Eng & Science (2009) 2 pages.

Reference: Polymer Properties, Polymer Products from Aldrich, Catalog No. Z41,247-3, VII (1999) pp. 46-49.

Communication Pursuant to Article 94(3) EPC issued in counterpart EP Application No. 10796357.1, dated Jul. 12, 2016.

Brandrup et al., "Polymer Handbook," 4th Ed., John Wiley & Sons, Inc. (1999), p. VII/694-701.

Communication Pursuant to Article 94(3) EPC issued in counterpart EP Application No. 10 796 357.1, dated May 9, 2019.

BASF SE et al., "Petrochemicals Technical Information: 2-Butoxyethanol acetate," Technical information data sheet, May 31, 2016, XP055585311, Retrieved from the Internet: URL:http://www.solvents.basf.com/portal/streamer?fid=278922 [retrieved on May 3, 2019].

Anna Wypych: "Databook of Plasticizers, 2nd Edition," In: "Chapter 3.23 Phtalates", Dec. 31, 2017, ChemTec Publishing, XP055585345, p. 524.

\* cited by examiner

PROCESS AND ADDITIVE TO IMPROVE ADHESION OF BUILDING COMPOSITIONS TO SUBSTRATES

CROSS-REFERENCE TO RELATED APPLICATIONS

This application is a divisional of U.S. patent application Ser. No. 13/515,347, filed Jun. 12, 2012, which is a national stage filing under 35 U.S.C. § 371 of PCT/EP2010/069690, filed Dec. 15, 2010, which claims priority to U.S. Provisional Patent Application No. 61/292,283, filed Jan. 5, 2010, and European Patent Application No. 09180024.3, filed Dec. 18, 2009, the contents of which are each incorporated herein by reference in their entirely.

The present invention relates to the use of an additive to improve adhesion to substrates, to a process to improve adhesion to substrates, and to a new additive for addition to mortars.

Additives for addition to mortars or budding compositions are well known. They may be in the form of redispersible powders and contain (co)polymers of ethylenically unsaturated monomers. Such additives are added to the mortars to, in al., increase the cohesion of the mortar or building composition. Good cohesion is reflected e.g. in a high scratch resistance and a high abrasion resistance.

However, building compositions need not only have a satisfactory cohesion, they also need to fulfill the requirement of adherence to the substrate on which they are applied. For some substrates on which building compositions are applied acquiring a satisfactory adhesion is quite a challenge. Examples of such substrates are e.g. found in the field of thermal isolation systems wherein mortars are frequently applied to polystyrene substrates.

EP 1 498 446 discloses a redispersible powder composition that is suitable for use as a coating or adhesive on different substrates, especially in mortars that can be used in thermal isolation systems. The powder comprises a polymerisate on the basis of vinyl ester, alkyl carboxylic acids, (meth)acrylic acid ester, vinyl aromatics, olefinic, dienic and vinyl halogenides, and one or more protective colloids that additionally may contain a pozzolanic compound.

WO 2005/047204 discloses a redispersible powder composition that is suitable for the production of heat insulating composite systems. The powder comprises a polymerisate containing vinyl ester, vinyl aromatic, acrylic acid ester, (meth)acrylic acid ester, fumaric acid ester and/or maleic acid ester monomers and carbonyl group-containing monomers and is made in the presence of a protective colloid.

DE 199 01 307 discloses a redispersible powder composition comprising a) at least one polymerisate from the group of vinyl ester, vinyl ester-comonomer, vinyl ester-ethylene, (meth)acrylic acid ester, and styrene-acrylic ester-polymerisates, b) 1 to 25 wt. % of at least one protective colloid, c) 1 to 25 wt. % of at least one partly-acetalized water-soluble polyvinyl alcohol, d) 0 to 20 wt. % of anticacking agent, and e) optionally further additives. The latter can be e.g. cement superplasticizers or plasticizers such as dibutyl phthalate. The claimed composition is said to improve adhesion on expanded polystyrene (EPS). This effect is attributed to the use of partially acetalized polyvinyl alcohol. The addition of plasticizers is not exemplified. Such plasticizers are known to be added to dispersions to reduce the minimum film forming temperatures of e.g. emulsion polymers such as polymerisates a) mentioned above.

However, there is a need in the building industry for building compositions that give an improved adhesion to substrates using lower amounts of chemicals, and that besides have a good balance in the desired adhesion and cohesion properties. Even more, it is desirable to come up with products in which the cohesion and adhesion characteristics of the material are not contributed to the end material by the same components, so that it is possible to optimize either the cohesion and/or the adhesion property of the building material without negatively influencing the other property.

The purpose of the invention has been achieved by the provision of an additive to improve the adhesion of a mortar to a building substrate, wherein the building substrate is selected from the group of polystyrene-containing substrates, polyolefin-containing substrates or polyvinyl chloride-containing substrates, the additive containing (i) a plasticizer that is liquid at 50° C. or lower, has a boiling point of 100° C. or higher, is capable of dissolving 1 wt. % of the building substrate, and that has a solubility parameter δ at 25° C. between 22.5 $MPa^{1/2}$ and 11 $MPa^{1/2}$, the plasticizer being selected from the group of esters, ketones, aldehydes, carbonates, aromatic compounds, heteroaromatic compounds, heterocyclic compounds, halogenated hydrocarbons, cyclic unsaturated compounds, terpenes, sulfates, and sulfoxides;

(ii) optionally, a filler that has a BET surface area of at least 40 $m^2/g$;

(iii) optionally, a biopolymer such as a cellulose ether;

(iv) optionally, a stabilizer such as a protective colloid; and (v) optionally, a water-insoluble film-forming (co)polymer based on ethylenically unsaturated monomers.

The present invention further provides a process to improve the adhesion of a mortar to a building substrate wherein the mortar is mixed at least with an additive, is applied to a building substrate selected from the group of polystyrene-containing substrates, polyolefin-containing substrates or polyvinyl chloride-containing substrates, and is allowed to dry, the additive containing (i) a plasticizer that is liquid at 50° C. or lower, has a boiling point of 100° C. or higher, is capable of dissolving 1 wt. % of the building substrate, and that has a solubility parameter δ at 25° C. between 22.5 $MPa^{1/2}$ and 11 $MPa^{1/2}$, the plasticizer being selected from the group of esters, ketones, aldehydes, carbonates, aromatic compounds, heteroaromatic compounds, heterocyclic compounds, halogenated hydrocarbons, cyclic unsaturated compounds, terpenes, sulfates, and sulfoxides;

(ii) optionally, a filler that has a BET surface area of at least 40 $m^2/g$;

(iii) optionally, a biopolymer such as a cellulose ether;

(iv) optionally, a stabilizer such as a protective colloid; and (v) optionally, a water-insoluble film-forming (co)polymer based on ethylenically unsaturated monomers, wherein the additive is a) in the form of a powder obtained by adsorbing the plasticizer (i) on a component selected from a mortar component and the components (ii), (iii), (iv) or (v), said component being in powder form; or b) in the form of a liquid dispersion or powder obtained by mixing the plasticizer (i) with the component (iii) and/or (iv) in pasty, swollen or dissolved form, optionally followed by drying said liquid dispersion; or c) the plasticizer (i), which is added to the mortar when mixing the mortar with water.

It was surprisingly found that adhesion to said building substrates, which are known to be difficult-to-adhere substrates, can be improved significantly by the inventive use of the additive as well as the inventive process. Thus, the addition of only very low amounts of plasticizer is required to provide full adhesion after dry and wet storage under standard conditions. Hence, e.g. only 0.2 wt. % of a powder containing 43 wt. % of a plasticizer provides a 100% pull-out after 7 days of dry storage and after 7 days dry storage followed by one day immersed in water, respectively.

In one embodiment the plasticizer, i.e. component (i), is the additive. Thus the plasticizer (i) can be e.g. added at the same time—as a dry mortar is being mixed with water—and/or afterwards. This has the advantage that the plasticizer can be used as such without the requirement of being further processed.

In another, preferred embodiment the additive contains, besides the plasticizer (i), at least one of the components (ii), (iii), (iv) or (v). This has the advantage that the plasticizer is finely distributed on a carrier, e.g. on component (ii) or (iii), or in a matrix, e.g. in component (iii) or (iv), wherein both the carrier and the matrix are e.g. powdery components which can be easily stored, transported, processed, and mixed into e.g. dry mortars. Furthermore, such combinations lead to an even higher efficiency of the additive. It is assumed that the additive, when combined with one of the components (ii), (iii), (iv) or (v), gets better distribution in the mortar, which causes the higher efficiency.

Furthermore, the invention claims an additive suitable for addition to mortars or building compositions obtainable by mixing the components (iii) and/or (iv) in a solvent to form a pasty, swollen or dissolved mixture and admixing the plasticizer (i) and optionally drying the obtained admixture to form a powder.

Suitable solvents are known to the person skilled in the art and depend on the specific choice of components (iii) and/or (iv) as well as on the selected drying process, if any. A particularly preferred solvent is water.

The inventive additive provides mortars with excellent adhesion characteristics on difficult-to-adhere substrates even in low amounts. It is free-flowing and has a good storability. When worked into a dry mortar, it imparts to the mortar a superior wettability when it is mixed with water. Additionally, it also provides a nice mortar rheology and contributes to the cohesion properties of the cured mortar.

The invention additionally provides a kit of parts containing as one part component (i), as another part component (ii), and, optionally, as further part(s) components (ii), (iii) and/or (iv), and a kit of parts containing as one part components (i) and (ii), (i) and (iii) or (i) and (iv), and as the other part component (v).

The component (i) and at least one of components (ii), (iii) or (iv) are present (i.e. non-optional) when using the additive and in the additive used in the process. In a preferred embodiment, components (i) and (ii) or (iv) and either of components (iii) and (v) are present.

In a preferred embodiment, the additive is in the form of a powder obtained by adsorbing the plasticizer (i) on a component selected from a mortar component and the components (ii), (iii), (iv) or (v), said component being in powder form. The skilled person is well aware of how to adsorb the plasticizer on a component in powder form. The obtained adsorbed powders are in general free-flowing, storage stable, and impart a good wettability when in contact with water.

The weight ratio of plasticizer to said component in powder form is preferably between about 95:5 and about 5:95, in particular between about 80:20 and about 20:80, most preferably between about 60:40 and about 25:75.

In another preferred embodiment, the additive is in the form of a liquid dispersion or powder obtained by mixing the plasticizer (i) with the components (iii) and/or (iv) in a solvent such as water and optionally drying the obtained admixture to form a powder. Particularly preferred is mixing the components (iii) and/or (iv) in water to form a pasty, swollen or dissolved mixture, followed by admixing the plasticizer (i), and optionally drying the obtained admixture to form a powder.

When the plasticizer (i) is mixed with the components (iii) and/or (iv) to obtain a liquid dispersion, the weight ratio of plasticizer to the amount of the sum of components (iii) and (iv) is preferably between about 90:10 and about 5:95, in particular between about 80:20 and about 15:85, most preferably between about 60:40 and about 25:75.

The solids content of said liquid dispersion can be very low, e.g. 10 wt. % or lower. However, often it is advantageous when it is 30 wt. % or higher, in particular 40 wt. % or higher. Furthermore, it can be as high as e.g. 80 wt. %, but often it is preferred for it to be up to e.g. 65 wt. %.

The liquid dispersion can be dried as such or further components can be added. Such components are well known to the skilled person in the art and include components to increase hydrophobicity such as organosilanes, fatty acids and their esters, to reduce shrinkage, to accelerate and/or retard setting of the mortar, to reduce efflorescence, as well as rheology control additives.

In one embodiment, the preferred component which may be added to the liquid dispersion is component (v) as aqueous dispersion. However, it is essential that the plasticizer is first thoroughly mixed with the components (iii) and/or (iv) before admixing component (v). Adding the plasticizer directly to component (v) is not part of the present invention.

In another embodiment, the liquid dispersion containing components (i) as well as (iii) and/or (iv) and the aqueous dispersion containing component (v) are sprayed separately, e.g. through a multi-component nozzle, and dried simultaneously.

The drying of the liquid dispersion containing components (i) as well as (iii) and/or (iv) can take place by means of every suitable process. Preferred are spray drying, freeze drying, fluidized bed drying, drum drying, granulation such as for instance fluid bed granulation and/or rapid drying, with spray drying being especially preferred. Spray drying can take place for instance by means of a spraying wheel or a one-component or multi-component nozzle. If necessary, the mixture to be dried can still be diluted with water, in order to achieve a suitable viscosity for the drying. The drying temperature in principle has no real limits. However, because of safety-related considerations, the temperature of the inlet gas should not, as a rule, exceed about 200° C., in particular about 175° C. In order to attain sufficiently efficient drying, temperatures of about 110° C. or higher, in particular of about 120° C. or higher, are often preferred.

In the context of the present invention, the term powder includes free-flowing powders, granules as well as flakes.

Such powders are in general storage stable and impart a good wettability when in contact with water. Furthermore, they are redispersible in water and thus disintegrate into smaller particles upon contact with water.

In yet another preferred embodiment, the filler, i.e. component (ii), the biopolymer, i.e. component (iii), the stabilizer, i.e. component (iv), or a mortar constituent serves as a carrier for the plasticizer, i.e. component (i). In such embodiment, the plasticizer adsorbed on or embedded in the carrier may be mixed with the components (iii) and/or (v) prior to mortar addition. In this embodiment, the used components (ii), (iii), (iv) and/or (v) are in the form of a powder, while the component (v) is e.g. in the form of a water-redispersible powder.

As in the additive in accordance with the invention the component (i), adsorbed on component (ii) or (iii) or embedded in component (iii) or (iv), contributes to providing better adhesion and the component (v) contributes to providing better cohesion; a lot of freedom is created to tweak the additive to get the optimum balance in adhesion and cohesion features for the desired use and/or for the substrate on which the mortar is applied.

Due to the high efficiency of the additive in adhering mortars to difficult-to-bond substrates, the amounts of additive which are added to the mortar can be as low as e.g. 0.005 wt. %, based on the dry content of the uncured mortar, including the additive. In order to ensure proper adhesion, however, it is advantageous to add 0.02 wt. % or more. The maximum amount of additive in the mortar depends also on the concentration of the plasticizer in the additive and it is often less than 5 wt. %, in particular less than 3 wt. %. Particularly preferred amounts of plasticizer based on the total solids content in the mortar are between 0.01 and 2 wt %.

It should be noted that EP 765 899 discloses the addition of a compound that is liquid at a temperature of 50° C. or lower on a carrier to redispersible powders. The document discloses that the liquid can be selected from a large group of different materials including plasticizers, but fails to disclose that the carrier is an inorganic carrier and that the compound may assist in providing improved adhesion of the building composition to substrates. It should be noted that in the Examples described in EP 765 899 only the use of a plasticizer on a polyvinyl chloride carrier material is described, providing a redispersible powder having improved block stability.

Additionally, it should be noted that EP 1193 287 discloses a powdery additive containing a carboxylic acid ester, which is a liquid material that may be adsorbed on a carrier. In one embodiment the carrier may be an inorganic carrier like precipitated silica. The additive, however, is described as being used for hydrophobizing building compositions and the document fails to acknowledge the use thereof in a process to improve the adhesion of building compositions to polymeric substrates.

In a preferred embodiment of the use and the process of the present invention, the additive is in the form of a powder, preferably a redispersible powder, or a dispersion in an aqueous liquid.

The Plasticizer (Component (i))

The plasticizer that can be used in the additive in the use and in the process of the present invention can be any compound which is known by the person skilled in the art to soften and/or partially dissolve plastics that can be present in a building substrate, like polystyrene, polyvinyl chloride or polyolefins. The plasticizer which is able to achieve this functionality is a liquid at a temperature of 50° C. or lower, has a boiling point of 100° C. or higher, and has a solubility parameter $\delta$ at 25° C. between 22.5 MPa$^{1/2}$ and 11 MPa$^{1/2}$.

As indicated above, the plasticizer that can be used in the invention should be able to soften and/or partially dissolve the polystyrene, polyolefin or polyvinyl chloride plastics in the polystyrene-containing, polyolefin-containing or polyvinyl chloride-containing building substrate. To satisfy this feature of the invention, the plasticizer should be capable of dissolving 1 wt. % of the building substrate, e.g. at 23° C. and standard pressure, e.g. 1 atm. No or only slight stirring is required. This can be established by adding 0.05 g of the polystyrene, polyolefin or polyvinyl chloride, preferably in small pieces, to 5 g of the plasticizer. If the building substrate fully dissolves in the plasticizer, which in embodiments can be visually determined by the formation of a clear liquid, the plasticizer is said to be able to dissolve partially or even fully the plastics in the building substrate. Preferably full dissolution takes place within 7 days, more preferably within 5 days.

In a number of documents, such as the *CRC Handbook of Solubility Parameters and Other Cohesion Parameters, 2$^{nd}$ Ed.*, A. F. M. Barton, CRC Press, 1991; pp. 123-138 or the *Polymer Handbook, 4$^{th}$ Ed.*, J. Brandrup et al. (Ed), John Wiley & Sons, Inc. (1999), p. VII/694-701, various solubility parameters can be found indicated by different names, all relating to the same product feature. Consequently, they are interchangeable. Thus, the Hildebrand solubility parameters $\delta$, the Hansen solubility parameters $\delta_t$ as well as Hoy's cohesion parameters for liquids $\delta_t$ can all be taken as the parameter $\delta$ of the present invention.

If for plasticizers that are a liquid at a temperature of 50° C. or lower and have a boiling point of 100° C. or higher, no solubility parameter $\delta$ at 25° C. can be found in the handbooks, the following test method can be used to establish that they are a plasticizer in accordance with the invention:

Test method to establish if a liquid is a plasticizer in accordance with the invention:

0.5 ml of the liquid to be tested (e.g. the plasticizer) is placed on an expanded polystyrene (EPS) board having a density of 20 kg/m$^3$. After a time of 7 days the surface of the EPS board is evaluated. The plasticizers according to the invention will have formed a hole or a pit which has a depth of at least 3 mm, preferably at least 5 mm.

Preferably, the solubility parameter $\delta$ at 25° C. of the plasticizer is 12 MPa$^{1/2}$ or higher, in particular 14 MPa$^{1/2}$ or higher.

Preferably, the plasticizer has a boiling point of 150° C. or higher. In one embodiment, the boiling point of the plasticizer is below 400° C.

The plasticizer may be selected from the group of esters, ketones, aldehydes, carbonates, aromatic compounds, heteroaromatic compounds, heterocyclic compounds, halogenated hydrocarbons, cyclic, unsaturated compounds, terpenes, sulfates, sulfoxides.

Of course, the person skilled in the art will be able to select the best plasticizer once the substrate on which the mortar is to be applied is known.

The amount of plasticizer in the mortar (based on solids, w/o liquid) in one embodiment is 0.01 to 2 wt. %, preferably 0.02 to 1 wt. %, in particular 0.05 to 0.75 wt. %.

The plasticizer may be adsorbed on one or more of the mortar components, e.g. sand, cement, filler, binder or fibre, it may be adsorbed on the filler with a BET surface area of >40 m$^2$/g, on the cellulose ether component or mixed with a stabilizer such as e.g. a water-soluble polymer (i.e. protective colloid), while said stabilizer is dissolved and dispersed in water, respectively, and the obtained mixture subsequently dried. Alternatively, the plasticizer can be added as liquid to pasty products, to the aqueous phase of a 2-K product, or directly to the mortar mixed with water.

It is preferred, however, when the "plasticizer" is not added to an aqueous dispersion of a water-insoluble film-forming (co)polymer as a neat liquid, since in that case it will plasticize the (co)polymer and not, or to a far lesser extent, act to increase the adhesion, as demonstrated by the invention.

Below are non-limiting examples of liquids that are suitable as plasticizers in the present invention.

Esters:

To the class of carboxylic acid esters belong saturated and unsaturated alkyl esters of $C_1$ to $C_{22}$ carboxylic acids, including fatty acid esters, such as $C_1$ to $C_8$ alkyl esters of $C_6$ to $C_{18}$ carboxylic acids. Non-limiting examples are methyl, ethyl, propyl, butyl, pentyl, hexyl, heptyl, octyl, nonyl, decyl, dodecyl, allyl and/or benzyl esters of hexanoic acid, heptanoic acid, octanoic acid, nonanoic acid, decanoic acid, dodecanoid acid, tetradecanoic acid, hexadecanoic acid, octadecanoid acid, eicosanoid acid, lauric acid, myristic acid, palmitic acid, stearic acid, arachidic acid, myristoleic acid, palmitoleic acid, sapienic acid, oleic acid, linoleic acid, linolenic acid, arachidonic acid, eicosapentaenoic acid, erucic acid, docosahexaenoic acid, rape oil methylester, alkyl sulfonic phenyl esters, also known under the trade names Mesamoll, Mesamoll II, and Mesamoll TP LXS 51067 from Lanxess, their mixtures, and derivatives thereof. Preferred are methyl, ethyl, propyl and/or butyl esters of decanoic acid, lauric acid, myristic acid, palmitic acid, rape oil, sulfonic phenyl esters, and mixtures thereof.

To the class of dicarboxylic acid esters belong in particular $C_1$ to $C_{12}$ alkyl esters of $C_2$ to $C_{20}$ dicarboxylic acids, such as $C_1$ to $C_{12}$ alkylesters of oxalic acid, malonic acid, succinic acid, gluteric acid, adipic acid, pimelic acid, suberic acid, azelaic acid, sebacaic acid, maleic acid, phthalic acid, as well as their mixtures and derivatives thereof. Non-limiting examples are dibutyl, dihexyl, and dioctyl oxalate; dipropyl, dibutyl, and dihexyl malonate; dimethyl, diethyl, and dipropyl succinate; dimethyl, diethyl, and dipropyl glutarate; bis(2-ethylhexyl)adipate; dimethyl, diethyl, and dipropyl adipate; monomethyl adipate, dioctyl adipate; dimethyl, diethyl, and dipropyl pimelate; dibutyl sebacate, dimethyl, diethyl, dipropyl, and di-n-butyl maleate; diisobutyl maleate, bis(2-ethylhexyl)phthalate, diisononyl phthalate, bi(n-butyl)phthalate, butyl benzyl phthalate, diisodecyl phthalate, di-n-oxtyl phthalate, diisooctyl phthalate, diethyl phthalate, diisobutyl phthalate, di-n-hexyl phthalate, as well as their mixtures and derivatives thereof. Preferred are diisononyl phthalate, dioctyl phthalate, dibutyl phtalate, dimethyl and diethyl adipate, dihexyl malonate, dihexyl and dioctyl oxalate, diisononyl-1,2-cyclohexane dicarboxylate, also known under the trade name Hexamoll DINCH from BASF, 2,2'-ethylenedioxydiethylbis(2-ethylhexanoate), also known under the trade name Oxfilm 351 from Oxea Chemicals, and mixtures thereof. Particularly preferred are dialkylcyclohexane dicarboxylates with the alkyl groups being a $C_4$ to $C_{12}$ group, e.g. diisononyl-1,2-cyclohexane dicarboxylate, and alkylene dioxydialkylbisalkyl alkanoates, with the alkylene and alkyl groups being a $C_2$ to $C_4$ group and the alkane group being a $C_4$ to $C_{10}$ group, e.g. 2,2'-ethylenedioxydiethylbis(2-ethylhexanoate).

To the class of tricarboxylic acid esters belong in particular $C_1$ to $C_{12}$ alkyl esters of citric acid, iso citric acid, aconitic acid, propane-1,2,3-tricarboxylic acid, trimesic acid, trimellitic acid, and their derivatives. Non-limiting examples are trimethyl citrate, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, acetyl tri-n-decyl citrate, trimethyl trimellitate, tri-(2-ethyihexyl) trimellitate, tri-(n-octyl, n-decyl) trimellitate, tri-(heptyl, nunyl) trimellitate, n-octyl trimellitate, as well as their mixtures and derivatives thereof. Preferred are acetyl tributyl citrate, butyryl trihexyl citrate, acetyl trioctyl citrate, trioctyl citrate, trimethyl citrate, acetyl tri-n-decyl citrate, and mixtures thereof.

To the class of esters belong also oils and fats, including vegetable oils such as olive oil, palm oil, soybean oil, canola oil, pumpkin seed oil, corn oil, sunflower oil, safflower oil, peanut oil, grape seed oil, sesame oil, argan oil, rice bran oil, mustard oil, almond oil, ghee, cottonseed oil, grape seed oil, diacylglycerol (DAG) oil, walnut oil, as well as their mixtures and derivatives thereof. Furthermore, also animal fats such as lard and butter can be used.

Fatty Alcohols:

To the class of fatty alcohols belong $C_6$ to $C_{35}$ saturated and unsaturated alcohols. Non-limiting examples of fatty alcohols are capryl alcohol, pelargonic alcohol, capric alcohol, lauryl alcohol, myristyl alcohol, cetyl alcohol, palmitoleyl alcohol, stearyl alcohol, isostearyl alcohol, elaidyl alcohol, oleyl alcohol, linoleyl alcohol, elaidolinoleyl alcohol, linolenyl alcohol, elaidolinolenyl alcohol, ricinoleyl alcohol, arachidyl alcohol, behenyl alcohol, erucyl alcohol, lignoceryl alcohol, ceryl alcohol, montanyl alcohol, cluytyl alcohol, myricyl alcohol, melissyl alcohol, geddyl alcohol, cetearyl alcohol, as well as their mixtures and derivatives thereof. Particularly preferred are capric alcohol, lauryl alcohol, myristyl alcohol, cetyl alcohol, palmitoleyl alcohol, stearyl alcohol.

Ketones, Including Diketones:

Non-limiting examples of ketones and diketones are acetophenone, benzophenone, acetylacetone, isophorone, cyclohexanone, n-hexanone, i-hexanone, methyl isobutylketone, diisopropyl ketone, dibutyl ketone, as well as the various isomers of heptanone and octanone, as well as their mixtures and derivatives thereof. Particularly preferred are diisopropyl ketone and dibutyl ketone.

Formamides:

Non-limiting examples of dialkyl formamides are diethyl formamide, dipropyl formamide, as well as their mixtures and derivatives thereof.

Carbonates:

Non-limiting examples of carbonates are alkyl carbonates, including dialkyl carbonates, such as methyl ethyl carbonate, diethyl carbonate, methyl propyl carbonate, ethyl propyl carbonate, di-n-propyl carbonate, di-n-propyl carbonate, dibutyl carbonate, as well as cyclic carbonates, such as ethylene carbonate, propylene carbonate, and butylene carbonate, as well as their mixtures and derivatives thereof. Preferred are di-n-propyl carbonate, dibutyl carbonate, propylene carbonate, and butylene carbonate, and mixtures thereof.

Aromatic Compounds:

To the class of aromatic compounds belong also alkyl benzoates, including $C_1$ to $C_{12}$ benzoates, toluene, xylene, cresole, mono-, di- and tri-styrenated phenols, $C_1$ to $C_{12}$ alkyl phenols, as well as their mixtures and derivatives thereof. Particularly preferred are cresol and styrenated phenols.

Heteroaromatic Compounds:

The class of heteroaromatic compounds includes also pyridine.

Heterocyclic Compounds:

To the class of heterocyclic compounds belong also pyrrolidone including 2-pyrrolidone and n-methyl pyrrolidone, lactones including butyrolactone and valerolactone, lactams including butyrolactam and valerolactam, furfuryl alcohol and tetrahydrofurfuryl alcohol, dioxane, as well as their mixtures and derivatives thereof.

Furthermore, it is also possible to use halogenated hydrocarbons.

The class of cyclic, unsaturated compounds includes hemiterpenes, monoterpenes such as α-, β-, γ-terpinenes, sesquiterpenes, diterpenes, sesterterpenes, triterpenes, tetraterpenes.

Non-limiting examples of monoterpenes are camphor, isonitrosocamphor, camphorchinon, menthol, limonene, pinene, menthadiene, terpinene, camphor carbonic acid ester and/or alkylhydroxymethylene camphor, as well as their mixtures and derivatives thereof.

Non-liming examples of diterpenes and their esters, are alkyl esters, in particular $C_1$ to $C_{12}$ alkyl esters, of neoabietinic acid, pimaric acid, isopimaric acid, abietic acid and its isomers, dehydroabietic acid, dihydroabietic acid, sylvic acid, palustric acid, colophony, retinal, tretinoine, agelasine E, agelasidine B, oxocativic acid, pinifolic acid, labdenic acid, dihydroxyhalimadieic acid, epoxyclerodatrienic acid, isopimaradienic acid, isopimaric acid, junceic acid, podocarpic acid, cassainic acid, cassaidin, cassain, cassamin, auricularic acid, cleistanthadienic acid, isocopalendial, abtietadienic acid, as well as their mixtures and derivatives thereof.

Non-liming examples of sesterterpene and their esters are alkyl esters, in particular $C_1$ to $C_{12}$ alkyl esters of dysideapalaunic acid, salvileucolide methyl ester, ophiobolin A, ophiobolin G and/or scalarin, as well as their mixtures and derivatives thereof.

Non-liming examples of triterpene and their esters are alkyl esters, in particular $C_1$ to $C_{12}$ alkyl esters, such as squalen, lanosterol, as well as their mixtures and derivatives thereof.

Particularly preferred are limonene, terpinene, menthadiene, pinene, and $C_1$ to $C_{12}$ alkyl esters of diterpene acids.
Sulfates and Sulfonates:

The class of sulfates and sulfonates includes $C_{12}$ to $C_{18}$ alkyl monoesters of sulfuric acid and sulfonic acid and their salts, in particular their alkali, earth alkali, and ammonium salts, as well as their mixtures and derivatives thereof. Particularly preferred are sodium, potassium, and ammonium lauryl sulfate and lauryl sulfonate.
Sulfoxides:

To the class of sulfoxides belong dialkyl sulfoxide, in particular with $C_1$ to $C_6$ alkyl groups, such as diethyl sulfoxide, and alliin, as well as their mixtures and derivatives thereof.
The Filler (Component (ii))

The filler having a BET surface area of at least 40 m$^2$/g that can be used in the present invention is preferably an inorganic filler. Examples of inorganic fillers are inorganic carriers like alumosilicate, silicon oxide, silicon dioxide, aluminium silicon oxide, calcium silicate hydrate, aluminium silicate, magnesium silicate, magnesium silicate hydrate, magnesium aluminium silicate hydrate, mixtures of silicic acid anhydrite and kaolinite, aluminium silicate hydrate, calcium aluminium silicate, calcium silicate hydrate, aluminium iron magnesium silicate, calcium carbonate, calcium magnesium carbonate, calcium metasilicate, anticaking agents, particulate titanium dioxide, expanded perlite, cellite, cabosil, circosil, aerosil, eurocell, fillite, promaxon, china clay, dolomite, limestone powder, chalks, layered silicates and/or precipitated silicas. Preferred are silicate, silicon dioxide, silica fume, fumed silica, carbonates, kaolin and/or china clay and most preferred are silicate, silicon dioxide and/or fumed silica.

In another, more preferred embodiment the inorganic filler has a primary particle size diameter (PSD) of below 1 micrometer. It can be as small as e.g. 0.1 μm or lower, but in general, due to the toxicity associated with the respiration of small dust particles and for handling reasons, it is preferred that the primary particles easily form aggregates and as such have particle sizes, measured e.g. by light scattering such as e.g. ISO 8130-1, of e.g. 10 to 300 μm, preferably 15 to 200 μm.

Even more preferably, the inorganic filler exhibits cementitious properties.

Well-known examples of fillers that exhibit cementitious properties are pozzolans and latent hydraulic binders. Pozzolans are materials that may be used as an addition to cement mixtures to increase the long-term strength and other material properties. Pozzolans are primarily siliceous or aluminosiliceous materials which react with calcium hydroxide to form calcium silicates. The most commonly used pozzolan today is fly ash, though silica-fume, high-reactivity metakaolin, ground granulated blast furnace slag, and other materials are also known as pozzolans. Volcanic ash and pulverized brick additives added to burnt lime, as well as cement particles, can function as a hydraulic binder. Examples of latent hydraulic binders or pozzolanes are metakaolin, burnt shale, diatomaceous earth, moler, rice husk ash, air cooled slag, calcium metasilicate and/or volcanic slag, volcanic tuff, trass, silica fume, microsilica, blast-furnace slag, and/or silica dust When the filler serves as carrier for the plasticizer, the BET surface area of the carrier material/filler when measured according to ISO 5794-1 preferably has a BET surface area of at least 40 m$^2$/g, preferably of at least 50 m$^2$/g, in particular of at least 75 m$^2$/g, and most preferably of at least 100 m$^2$/g. In one embodiment the BET surface area can be as high as up to 1,000 m$^2$/g, preferably it is up to 600 m$^2$/g.

In one embodiment the weight ratio of the total amount of filler to the total amount of plasticizer is preferably between about 75:25 and about 5:95, in particular between about 70:30 and about 10:90, most preferably between about 60:40 and about 20:80.
The Biopolymer (Component (iii))

The biopolymer, such as a polysaccharide or a peptide, may be of natural origin or it may have been prepared. These polymers as such are solids at room temperature and preferably have a high molecular weight. The biopolymers typically have a bulk density of about 200 g/l or higher, in particular of about 400 g/l and higher. Hollow solid polymer particles are less preferred. Biopolymers and their derivatives are also usable as carrier material for the plasticizer. In one preferred embodiment, the plasticizer (i) is adsorbed on the biopolymer, in particular on biopolymers which may be used as thickeners and/or as water retention agents. These materials are well known to the person skilled in the art.

In another preferred embodiment, the biopolymer is dissolved in a solvent such as water and mixed with the plasticizer to obtain a liquid dispersion, which may be dried to obtain a powder. Particularly preferred biopolymers for this embodiment are lower in viscosity when dissolved in water. Thus, they have a Brookfield viscosity as 10 wt. % aqueous solution of e.g. below 10,000 mPas, when measured at room temperature.

Non-limiting examples of such biopolymers are cold water-soluble polysaccharides and polysaccharide ethers, such as for instance cellulose ethers, starch ethers (amylose and/or amylopectin and/or their derivatives), guar ethers, dextrins and/or alginates. Also synthetic polysaccharides such as anionic, nonionic or cationic heteropolysaccharides can be used, in particular xanthan gum, welan gum and/or diutan gum. The polysaccharides can be, but do not have to be, chemically modified, for instance with carboxymethyl, carboxyethyl, hydroxyethyl, hydroxypropyl, methyl, ethyl, propyl, sulfate, phosphate and/or long-chain alkyl groups. Preferred usable peptides and/or proteins are for instance gelatine, casein and/or soy protein. Quite especially preferred biopolymers are dextrins, starches, starch ethers, casein, soy protein, gelatine, hydroxyalkyl-cellulose and/or alkyl-hydroxyalkyl-cellulose, wherein the alkyl group may be the same or different and preferably is a $C_1$- to $C_6$-group, in particular a methyl, ethyl, n-propyl- and/or i-propyl group.

One or more cellulose ethers can be used. They are preferably selected from the group of alkyl hydroxyalkyl cellulose ethers and/or alkyl cellulose ethers, but can also contain some further modification. The alkyl groups of the alkyl hydroxyalkyl cellulose ethers and/or alkyl cellulose ethers are preferably methyl, ethyl, propyl groups and/or mixtures thereof and the hydroxyalkyl groups of the alkyl hydroxyalkyl cellulose ether are preferably hydroxymethyl, hydroxyethyl, hydroxypropyl groups and/or mixtures thereof. A preferred alkyl cellulose ether is methyl cellulose; preferred hydroxyalkyl cellulose ethers are hydroxyethyl cellulose and hydroxyethyl hydroxypropyl cellulose and preferred alkyl hydroxyalkyl cellulose ethers are methyl hydroxyethyl cellulose, methyl ethyl hydroxyethyl cellulose, and methyl ethyl hydroxyethyl hydroxypropyl cellulose.

Particularly preferred biopolymers, i.e. component (iii), are cellulose ether, starch ether, guar ether, dextrine, alginate, xanthan gum, welan gum, diutan gum, gelatine, casein, and soy protein.

The viscosity of the cellulose ether to be used is an important criterion for determining the rheological characteristics of the freshly mixed mortar. The Brookfield viscosity measured at 20 rpm and as a 2% aqueous solution at 20° C. is approximately 100 to 100,000 mPas, particularly approximately 1,000 to 75,000 mPas, and in particularly preferred manner approximately 5,000 to 50,000 mPas.

The Stabilizer (Component (iv))

The additive used in the invention may contain a stabilizer such as a surfactant and/or a protective colloid, which is generally a synthetic water-soluble polymer, which may be further be modified. In one preferred embodiment, the plasticizer (i) is adsorbed on the protective colloid. In another preferred embodiment, the surfactant and/or the protective colloid is dissolved in a solvent such as water and mixed with the plasticizer to obtain a liquid dispersion, which may be dried to obtain a powder. When the liquid dispersions are dried, the stabilizer preferably contains at least one protective colloid and/or a biopolymer (iii).

These water-soluble polymers are solids at room temperature and preferably have a molecular weight of about 1,000 or higher, in particular of about 5,000 or higher. When several water-soluble polymers are used, use can also be made of a combination of one or more biopolymers with one or more synthetic water-soluble polymers. The latter typically have a bulk density of about 200 g/l or higher, in particular of about 400 g/l and higher. Hollow solid polymer particles are less preferred.

Synthetic, water-soluble organic polymers preferred as carrier material can consist of one or several polymers, for instance one or more polyvinyl pyrrolidones and/or polyvinyl acetals with a molecular weight of 2,000 to 400,000, fully or partially saponified polyvinyl alcohols and their derivatives, which can be modified for instance with amino groups, carboxylic acid groups and/or alkyl groups, with a degree of hydrolysis of preferably about 70 to 100 mol. %, in particular of about 80 to 98 mol. %, and a Höppler viscosity in 4% aqueous solution of preferably 1 to 100 mPas, in particular of about 3 to 50 mPas (measured at 20° C. in accordance with DIN 53015), as well as melamine formaldehyde sulfonates, naphthalene formaldehyde sulfonates, polymerizates of propylene oxide and/or ethylene oxide, including their copolymerizates and block copolymerizates, styrene-maleic acid and/or vinyl ether-maleic acid copolymerizates. Quite especially preferred are synthetic organic polymers, in particular partially saponified, optionally modified, polyvinyl alcohols with a degree of hydrolysis of 80 to 98 mol. % and a Höppler viscosity as 4% aqueous solution of 1 to 50 mPas and/or polyvinyl pyrrolidone.

Particularly preferred protective colloids, i.e. component (iv), are fully or partially saponified polyvinyl alcohols and their derivatives, polyvinyl pyrrolidone, polyvinyl acetal, melamine formaldehyde sulfonates, naphthalene formaldehyde sulfonates, polymerizates of propylene oxide and/or ethylene oxide, including their copolymerizates and block copolymerizates, styrene-maleic acid and vinyl ether-maleic acid copolymerizates.

Suitable surfactants are well known to the person skilled in the art. They can be of non-ionic, anionic, cationic and/or amphoteric nature and include higher molecular oligomers. Non-limiting examples include alkyl sulfonates, alkylaryl sulfonates, alkyl sulfates, hydroxylalkanol sulfates, alkyl and alkylaryl disulfonates, sulfonated fatty acids, sulfates and phosphates of polyethoxylated alkanoles and alkylphenols, as well as esters of sulfosuccinic acid, quaternary alkylammonium salts, quaternary alkylphosphonium salts, polyaddition products such as polyalkoxylated adducts of e.g. 5 to 50 mol ethylene oxide and/or propylene oxide per mol of linear and/or branched $C_6$- to $C_{22}$-alkanoles, alkylphenols, higher fatty acids, higher fatty acid amines, primary and/or secondary higher alkyl amines, wherein the alkyl groups are preferably a linear and/or branched $C_6$- to $C_{22}$-alkyl group.

The Water-Insoluble Film-Forming Copolymer (Component (v))

The component (v) in the additive according to the invention, which is the component suitable to provide cohesion, contains a water-insoluble film-forming (co)polymer based on ethylenically unsaturated monomers. This component is optionally present in the additive that is added to the mortar in the process of the invention. Though in a preferred embodiment the component (v) is present in the additive used in the process of the invention, it may also be added to the mortar separately.

In one embodiment the component (v) is in powder form, e.g. water-redispersible powder, and e.g. mixed as powder with the additive, the latter also being in powder form. In another embodiment the component (v) is in the form of an aqueous dispersion. Film-forming means that the copolymer is capable of forming a film determined according to DIN 53787 at a temperature of 23° C. or higher; preferably at 10° C. or higher; in particular at 5° C. or higher.

The water-insoluble film-forming (co)polymer of ethylenically unsaturated monomers preferably comprises monomers from the group of vinyl acetate, ethylene, acrylate, methacrylate, vinyl chloride, styrene, butadiene, $C_4$-$C_{12}$ vinyl ester monomers.

Film-forming, water-insoluble (co)polymers are most typically water-dispersible and/or redispersible in water. Preferred water-insoluble polymers are based on emulsion, suspension and/or dispersion polymers which when dispersed in water are typically film-forming at room temperature. Most typically, they are based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, wherein the vinyl versatate preferably is a $C_4$- to $C_{12}$-vinyl ester, in particular a $C_9$-, $C_{10}$- and/or a $C_{11}$-vinyl ester, and the polymerizates can contain about 0-50 wt. %, in particular about 0-30 wt. %, and quite especially preferably about 0-10 wt % of further monomers, in particular monomers with functional groups.

In one embodiment the amount of water-insoluble film-forming (co)polymer in the mortar is, on the basis of the total solids content of the mortar, i.e. including the copolymer, up to 10 wt. %, preferably up to 4 wt. %, in particular up to 3 wt. %. The amounts can be as low as 0.05 wt. % but often are 0.1 wt. % or higher.

In another embodiment, the weight ratio of the plasticizer (on carrier/filler) to the water-insoluble film-forming copolymer component (v), if this component is used, is preferably between about 70:30 and about 1:99, in particular between about 50:50 and about 10:90.

In one embodiment the plasticizer (i) is not present in the component (v). In particular, the plasticizer (i) is not present as such in the component (v) when the latter is in the form of an aqueous dispersion and/or not added as such to the aqueous dispersion of component (v) before drying it to form a water redispersible powder.

The Mortar

Where in this specification the term "mortar" is used, it must be understood that this covers a mix of one or more inorganic or organic binders, aggregates, fillers, additives and/or admixtures. A mortar component is an ingredient of the final mortar. Such mortars are well known to the person skilled in the art.

In one embodiment, the mortar is a dry mortar or contains a dry mortar component, the additive is added as a powder to the dry mortar or dry mortar component, and the mortar is mixed with water and optional further liquid components prior to its application.

In another embodiment, the mortar is a pasty mortar or contains a liquid component, the additive is added as a liquid dispersion to the pasty mortar or the liquid component, and the mortar is mixed with the liquid dispersion or the liquid component prior to its application.

The mortar in accordance with the invention is preferably a dry mortar. However, it also can be a pasty mortar or a mortar having two or more components, such as e.g. a cementitious, dry component and a liquid component containing various organic compounds. In one embodiment the dry mortar formulation contains no mineral binder. In another embodiment, it contains one or more mineral binders. In the context of the invention, mineral binders are binders which are typically solids and in particular consist of at least a) a hydraulically setting binder, in particular cements, activated blast furnace slags and/or silico-calcareous fly ash, b) a latent hydraulic binder, such as in particular pozzolanes and/or metakaolin, which reacts hydraulically in combination with a calcium source such as calcium hydroxide and/or cement, and c) a non-hydraulic binder which reacts under the influence of air and water, in particular calcium hydroxide, calcium oxide, quicklime, hydrated lime, magnesia cements, water glass and/or gypsum, by which is meant in this invention in particular calcium sulfate in the form of $\alpha$- and/or $\beta$-semihydrate and/or anhydrite of form I, II and/or III.

Preferred cements are in particular Portland cement, for instance in accordance with EN 197-1 CEM I, II, III, IV, and V, and/or calcium phosphate cement and/or aluminous cement such as calcium aluminate cement and/or calcium sulfo-aluminate cement.

Preferred latent hydraulic binders or pozzolanes are metakaolin, burnt shale, diatomaceous earth, moler, rice husk ash, air cooled slag, calcium metasilicate and/or volcanic slag, volcanic tuff, trass, fly ash, silica fume, microsilica, blast-furnace slag, and/or silica dust.

Preferred non-hydraulic binders are gypsum, by which is meant in this invention in particular calcium sulfate in the form of $\alpha$- and/or $\beta$-semihydrate and/or anhydrite of form I, II and/or III, calcium hydroxide, calcium oxide, lime such as quicklime and/or hydrated lime, magnesia cements and/or water glass.

The preferred minerally binding material is a hydraulically binding material, in particular Portland cement, or a mixture of Portland cement, calcium aluminate cement, and gypsum The Substrate The substrate on which the mortar is applied in accordance with the process of the invention can be selected from the group of polystyrene-containing substrates, polyolefin-containing substrates or polyvinyl chloride-containing substrates.

Polystyrene-containing substrates, polyolefin-containing substrates or polyvinyl chloride (PVC)-containing substrates are also known as difficult-to-bond substrates. Thus, it is a challenge to achieve proper adhesion of mortars to these substrates.

An example of polystyrene-containing building substrates is expanded polystyrene, which is widely used in thermal insulation. Expanded polystyrene may be modified with graphite. Another polystyrene-containing substrates is extruded polystyrene, also known under the abbreviation XPS. The inventive process can be used for mortars which bond the expanded polystyrene to the wall, which often is a concrete or a brick wall, as well as for base coat and top coat mortars, into which commonly the glass fibre net is embedded. Mortars for this application are also called thermal insulation mortars.

Examples of polyolefin- and polyvinyl chloride-containing substrates are floors which are covered with polyolefin- and polyvinyl chloride-containing material such as PVC or polyolefin tiles, laminates, rolled layers of a PVC or polyolefin covering, carpets, remainders thereof and/or adhesives used to adhere said substrates to the floor. In particular when renovating rooms with floors containing such substrates, or residues thereof, e.g. after removing a carpet, it remains a challenge to formulate a mortar which is suitable for application without removing all remaining residues of the former flooring substrate as well as the adhesive used to bond it to the floor. Mortars for this application can be formulated as screeds, in particular as self-levelling floor screeds, as sealing compounds, primers, parquet adhesives, skim coats, levelling compounds, in particular self-levelling compounds.

EXAMPLES

The invention is further elucidated with reference to the following examples. Unless indicated otherwise, the tests are carried out at a temperature of 23° C. and a relative humidity of 50%.

Example 1: Adsorption of Plasticizer on a Filler (50:50 Ratio)

20.0 g of Sipernat 22 (ex-Evonik Industries; a chemically obtained silicon dioxide having a BET surface of 190 g/m$^2$, an average particle size of 100 μm, measured following ISO 8130-1, and an average primary particle size of 15 nm were placed into a 300 ml plastic beaker. The same amount of the plasticizers, as indicated in Tables 1 and 2, was slowly added over a period of 2 minutes to the Sipernat 22, while continuously stirring using a 60 mm propeller stirrer with an increasing rate from low to 1,000 rpm. The resulting mixture was further mixed for another 20 minutes to result in a homogeneous, white, dry, and free-flowing powder. The plasticizers were all properly adsorbed and showed no signs of wetting when being put between fingers.

The obtained powder can be easily mixed either directly with the other mortar components and/or with other solid mortar additives such as e.g. water-redispersible powders, cellulose ethers, cellulose fibres, defoamers, superplasticizers, hydrophobic agents, shrinkage reducing agents and/or additives to reduce efflorescence.

It is noted that the same procedure can be followed using other fillers.

Example 2: Adsorption of Plasticizer on a Filler (60:40 Ratio)

The procedure of Example 1 was repeated with the modification that a total of 30.0 g of plasticizer or of a mixture of plasticizers were added to 20.0 g of Sipernat 22. Again, the plasticizers were all properly adsorbed and showed no signs of wetting when being put between fingers.

Example 3: Preparation of Powder 1 (Mixture of Plasticizer and Protective Colloid as Stabilizer)

To 100 g of a 20% aqueous polyvinyl alcohol solution with a degree of hydrolysis of 88 mol. % and a Höppler viscosity as 4% solution of 4 mPas in a 500 ml glass vessel with a propeller stirrer with a stirring speed of 1,000 rpm, were added slowly at room temperature 20.0 g of 2,2'-ethylene dioxydiethylbis(2-ethylhexanoate) (OXFILM 351), while the plasticizer was emulsified completely. The obtained emulsion was subsequently dried by means of conventional spray drying at an inlet temperature of 125° C. to a white, free flowing, and readily water-redispersible powder in good yield, in which process no significant fouling occurred in the spraying tower. 100 parts by weight of the resultant powder were mixed with 13.6 parts by weight of a 83.3:16.7 mixture of commercially available calcium/magnesium carbonate and fumed silica.

Example 4: Preparation of a Dry Mortar Master Batch and Mortar Premix

Prepared were 5 kg of a cement-based dry mortar master batch consisting of 340 parts by weight of a commercially available Portland cement CEM I 42.5, 598 parts by weight of a quartz sand (0.1-0.6 mm), 30 parts by weight of a commercially available hydrated lime, and 2 parts by weight of a commercially available cellulose ether (methylhydroxyethyl cellulose), in which process the components were mixed in a 10 l vessel with a FESTO stirrer until a homogeneous dry mortar master batch was obtained.

For each experiment, samples of the dry mortar master batch were, where applicable, dry mixed with the plasticizer adsorbed on the filler and the water-redispersible powder, respectively. The respective amounts are indicated in Tables 1 and 2. 300 g of the obtained dry mixtures were added slowly to water while stirring. The amount of water used is indicated in Tables 1 and 2. This mixture was stirred for one minute with a 60 mm propeller stirrer with a speed of 800 rpm. After a maturing time of 3 minutes the mortar was again stirred by hand for 15 seconds before it was applied.

Example 5: Determination of the Adhesive Strengths on Expanded Polystyrene, Following ETAG 004 (Guideline for European Technical Approval of External Thermal Insulation Composite Systems with Rendering, European Organisation for Technical Approvals)

Using a spacer, the mortar samples from Example 4 were applied with a thickness of 3 mm onto expanded polystyrene (EPS) blocks having the dimensions 500 mm×100 mm×60 mm and a density of 20 kg/m$^3$. The specimens were stored at 23° C. and 50% relative humidity for 7 days (dry storage). Another set of specimens after the same dry storage period was immersed in water for 1 day. One day before the end of the dry storage period, 5 circles were drilled 5 mm deep into the EPS, using a crown driller with an inside diameter of 50 mm. Afterwards, metal plates with a 50 mm outer diameter were glued onto the cut mortar circles. The adhesive strengths and pull-out were determined in accordance with ETAG 004 by vertically pulling up the metal plate with the mortar specimen glued to it. The obtained data were averaged over the number of measured samples. The percentages of the pull-out were assessed visually. The measured adhesive strengths in N/mm$^2$ are of less relevance, since they indicate the cohesion of the substrate at a 100% pull-out. At 0% pull-out, the values are so low that the adhesion of the mortar to the substrate is negligible.

TABLE 1

Adhesion strengths, pull-out, and hydrophobicity of various mortar samples on EPS.

| | Exp. No. | | | | | |
|---|---|---|---|---|---|---|
| | 1-a (Ref) | 1-b (Ref) | 1-c (Ref) | 1-d | 1-e | 1-f |
| MEDA$^{a)}$ | 0 | 0 | 0 | 0.5 | 0.25 | 0.1 |
| DINP$^{b)}$ | 0 | 0 | 0 | 0 | 0 | 0.4 |
| S-22$^{c)}$ | 0 | 0 | 0 | 0.5 | 0.25 | 0.5 |
| RPP-1$^{d)}$ | 0 | 0 | 0 | 0 | 0.5 | 0.5 |
| RPP-2$^{e)}$ | 0 | 1.5 | 3.0 | 0 | 0 | 0 |
| H2O$^{f)}$ [%] | 22 | 21 | 22 | 21 | 21 | 22 |
| dry$^{g)}$ [%] | 0 | 5 | 90 | 90 | 95 | 100 |
| dry$^{h)}$ [N/mm$^2$] | 0.05 | 0.11 | 0.16 | 0.14 | 0.13 | 0.15 |
| wet$^{i)}$ [%] | 0 | 5 | 50 | 85 | 85 | 100 |
| wet$^{j)}$ [N/mm$^2$] | 0.07 | 0.08 | 0.12 | 0.13 | 0.13 | 0.14 |

TABLE 1-continued

Adhesion strengths, pull-out, and hydrophobicity of various mortar samples on EPS.

| | Exp. No. | | | | | |
|---|---|---|---|---|---|---|
| | 1-a (Ref) | 1-b (Ref) | 1-c (Ref) | 1-d | 1-e | 1-f |
| Hydroph[k] [min] | 35 | 50 | 50 | >120[l] | >120[l] | >120[l] |

[a] MEDA stands for methyl ester of dodecanoic acid (SigmaAldrich), which is a liquid at room temperature, having a boiling point of 261-262° C. and a solubility parameter of 16.0 MPa$^{1/2}$. In experiments 1-d to 1-f, it was adsorbed on Sipernat 22 prior to being added to the mortar mixture. 5.0 g MEDA dissolve 0.05 g of the substrate used (EPS) at 23° C. within 1 minute.
[b] DINP stands for diisononyl phthalate (SigmaAldrich), which is a liquid at room temperature, having a boiling point of 270 to 280° C. and a solubility parameter of 18.1 MPa$^{1/2}$. In experiment 1-f, it was adsorbed together with MEDA on Sipernat 22 prior to being added to the mortar mixture. 5.0 g DINP dissolve 0.05 g of the substrate used (EPS) at 23° C. within 3 days.
[c] S-22 stands for Sipernat 22 (Evonik).
[d] As water-redispersible polymer powder was added RPP-1, a polyvinyl alcohol-stabilized, ethylene-vinyl acetate copolymer with a glass transition temperature $T_g$ of 42° C. (Elotex MP2060).
[e] As water redispersible polymer powder was added RPP-2, a polyvinyl alcohol-stabilized, ethylene-vinyl acetate copolymer with a glass transition temperature $T_g$ of −4° C. (Elotex FX2320).
[f] Amount of added water to make up the mortar, based on 100 g dry mortar, including the mentioned additives.
[g] Pull-out after dry storage; 100% refers to 100% pull-out (only cohesion failure within the EPS) and 0% refers to no EPS pull-out, but just adhesion failure between the EPS-mortar interface.
[h] Measured adhesion/cohesion strength of specimen after dry storage.
[i] Pull-out after wet storage.
[j] Measured adhesion/cohesion strength of specimen after wet storage.
[k] The hydrophobicity was determined by dropping 0.5 ml of water onto the mortar surface and measuring the time until the water drop was fully absorbed.
[l] The water drop was still visible on the mortar surface after 2 hours.

The results from Table 1 clearly show that a mortar without any additive (Exp. 1-a) does not properly adhere on EPS, since the pull-out is 0% after both dry and wet storage. When a state-of-the-art redispersible powder RPP-2 is added to the mortar, which is particular suitable for improving the adhesion to EPS, even amounts of e.g. 3 wt. % (Exp. 1-c) do not lead to a pull-out of 100%. However, when use is made of a small amount of a suitable plasticizer (e.g. only 0.25 wt. % in Exp. 1-e) or mixture of plasticizers (Exp. 1-f) which can be adsorbed on an inorganic carrier, good to excellent pull-out is achieved after dry and wet storage (Exp. 1-d to 1-f).

While RPP-1 does not contribute to mortar adhesion to EPS (see e.g. Exp. 2-b), it does increase the cohesion of the mortar as well as contributing to the adhesion of the mortar to e.g. concrete, which is a typical substrate the EPS boards are adhered to when insulating buildings. Thus, it is easily possible to optimize mortar adhesion to EPS by adding a small amount of a suitable plasticizer. In addition to this, it is possible to choose independently thereof redispersible powders which are most suitable to provide other sought after properties, such as improved mortar cohesion and improved adhesion to inorganic substrates such as concrete, without compromising on other properties such as adhesion to difficult-to-bond substrates such as polystyrene-, polyolefin-, and polyvinyl chloride-containing substrates.

TABLE 2

Adhesion strengths, pull-out and hydrophobicity of various mortar samples on EPS.

| | Exp. No. | | | | | |
|---|---|---|---|---|---|---|
| | 2-a (Ref) | 2-b (Ref) | 2-c | 2-d | 2-e | 2-f |
| DBP[a] | 0 | 0 | 0.75[j] | 0.25 | 0.083 | 0.375 |
| S-22[b] | 0 | 0 | 0 | 0.25 | 0.083 | 0.375 |

TABLE 2-continued

Adhesion strengths, pull-out and hydrophobicity of various mortar samples on EPS.

| | Exp. No. | | | | | |
|---|---|---|---|---|---|---|
| | 2-a (Ref) | 2-b (Ref) | 2-c | 2-d | 2-e | 2-f |
| RPP-1[c] | 0 | 1.0 | 0 | 0 | 0.083 | 0.75 |
| H2O[d] [%] | 22 | 22 | 21 | 21 | 21 | 21 |
| dry[e] [%] | 0 | 0 | 100 | 100 | 55 | 100 |
| dry[f] [N/mm$^2$] | 0.05 | 0.07 | 0.15 | 0.15 | 0.13 | 0.13 |
| wet[g] [%] | 0 | 0 | 100 | 100 | 70 | 100 |
| wet[h] [N/mm$^2$] | 0.07 | 0.05 | 0.13 | 0.15 | 0.13 | 0.14 |
| Hydroph[i] [min] | 35 | 40 | N/A[k] | 30 | N/A[k] | 60 |

[a] DBP stands for dibutyl phthalate (SigmaAldrich), which is a liquid at room temperature, having a boiling point of 340° C. and a Hansen solubility parameter of 20.3 MPa$^{1/2}$. In experiments 2-d to 2-f, it was adsorbed on Sipernat 22 prior to being added to the mortar mixture. 5.0 g DBP dissolve 0.05 g of the substrate used (EPS) at 23° C. within 15 minutes.
[b] S-22 stands for Sipernat 22 (Evonik).
[c] As water-redispersible polymer powder was added RPP-1, a polyvinyl alcohol-stabilized, ethylene-vinyl acetate copolymer with a glass transition temperature $T_g$ of 42° C. (Elotex MP2060).
[d] Amount of added water to make up the mortar, based on 100 g dry mortar, including the mentioned additives.
[e] Pull-out after dry storage; 100% refers to 100% pull-out (only cohesion failure within the EPS) and 0% refers to no EPS pull-out, but just adhesion failure between the EPS-mortar interface.
[f] Measured adhesion/cohesion strength of specimen after dry storage.
[g] Pull-out after wet storage.
[h] Measured adhesion/cohesion strength of specimen after wet storage.
[i] The hydrophobicity was determined by dropping 0.5 ml of water onto the mortar surface and measuring the time until the water drop was fully absorbed.
[j] The DBP was added as a liquid to the mortar batch prior to water addition.
[k] No data are available.

The results from Table 2 clearly show that a mortar without any additive (Exp. 2-a) and a mortar with 1 wt. % of a water-redispersible powder only (Exp. 2-b) do not really adhere on expanded polystyrene, since the pull-out is 0% after both dry and wet storage. However, when even a small amount of plasticizer is added, the adhesion increases significantly. For example, 0.75 wt. % of DBP (Exp. 2-c), which was added as liquid to the mortar, leads to 100% pull-out after dry and wet storage. The same results can also be achieved with significantly lower amounts. The same good adhesion characteristics can be found when DBP is adsorbed on a carrier, even at significantly lower added amounts. Thus, it was highly surprising to see that even a very small amount of 0.083 wt. % of DBP still gives a pull-out of 55% after dry and of 70% after wet storage. This result is even more surprising since the DBP, being adsorbed on a carrier, is insoluble in water.

Besides achieving excellent mortar adhesion to EPS with very small amounts of various types of plasticizers, it is also possible to adjust the mortar hydrophobicity according to specific needs. Thus when e.g. using a fatty acid ester such as a methyl ester of dodecanoic acid (Exp. 1-d to 1-f), a hydrophobic mortar surface is obtained, leading to water-repelling characteristics. However, when this feature is not sought, another plasticizer, e.g. DBP, can be used (Exp. 2-c to 2-f).

TABLE 3

Adhesion strengths and pull-out of various mortar samples on EPS.

| | Exp. No | | | | | | |
|---|---|---|---|---|---|---|---|
| | 3-a | 3-b | 3-c | 3-d | 3-e | 3-f | 3-g |
| DINCH[a] | 0 | 0 | 0.15 | 0.10 | 0.0625 | 0 | 0 |
| Oxfilm 351[b] | 0 | 0 | 0 | 0.02 | 0 | 0 | 0 |

TABLE 3-continued

Adhesion strengths and pull-out of various mortar samples on EPS.

| | Exp. No | | | | | | |
|---|---|---|---|---|---|---|---|
| | 3-a | 3-b | 3-c | 3-d | 3-e | 3-f | 3-g |
| RME[c] | 0 | 0 | 0 | 0 | 0.0125 | 0 | 0 |
| Mesa-moll[d] | 0.15 | 0.15 | 0 | 0 | 0 | 0 | 0 |
| S-22[e] | 0.15 | 0.15 | 0.15 | 0.08 | 0.05 | 0 | 0 |
| Powder 1[f] | 0 | 0 | 0 | 0 | 0 | 0.1 | 0.2 |
| RPP-1[e] | 0 | 1.2 | 1.2 | 0.8 | 1.125 | 0 | 0 |
| RPP-2[e] | 1.2 | 0 | 0 | 0 | 0 | 0 | 0 |
| $H_2O$[e] [%] | 21 | 21 | 21 | 21 | 21 | 21 | 21 |
| dry[e] [%] | 80 | 70 | 100 | 100 | 100 | 95 | 100 |
| dry[e] [N/mm²] | 0.12 | 0.11 | 0.12 | 0.12 | 0.11 | 0.12 | 0.13 |
| wet[e] [%] | 95 | 65 | 100 | 100 | 95 | 75 | 100 |
| wet[e] [N/mm²] | 0.12 | 0.11 | 0.11 | 0.10 | 0.11 | 0.10 | 0.11 |

[a]DINCH stands for Diisononyl-1,2-cyclohexanedicarboxylate (HEXAMOLL DINCH from BASF), which is a liquid at room temperature, having a boiling point of 240-250° C. and a solubility parameter at 25° C. of 17.0 MPa$^{1/2}$. 5.0 g DINCH dissolve 0.05 g of the substrate used (EPS) at 23° C. within 3 days.
[b]Oxfilm 351 stands for 2,2'-Ethylenedioxydiethylbis(2-ethylhexanoate) (Oxea Chemicals), which is a liquid at room temperature, having a boiling point of 351° C. and a solubility parameter at 25° C. of between 22.5 MPa$^{1/2}$ and 11 MPa$^{1/2}$. 5.0 g Oxfilm 351 dissolve 0.05 g of the substrate used (EPS) at 23° C. within 15 minutes.
[c]RME stands for Rape Oil Methyl ester (Flamol Mineralol; Bern, CH), which is a liquid at room temperature, having a boiling point of above 200° C. and a solubility parameter at 25° C. of about 17 MPa$^{1/2}$. 5.0 g RME dissolve 0.05 g of the substrate used (EPS) at 23° C. within 5 minutes.
[d]Mesamoll stands for alkyl sulfonic phenyl ester (Lanxess), which is a liquid at room temperature, having a boiling point of about 200° C. and a solubility parameter at 25° C. of about 20 MPa$^{1/2}$. 5.0 g Mesamoll dissolve 0.05 g of the substrate used (EPS) at 23° C. within 3 days.
[e]See Table 1 for explanation.
[f]Powder 1 is made according to Example 3.

In Exp. No. 3-a to 3-c powders according to Example 1 are used. They indicate that the type of RPP, i.e. component (v), does not have a real impact on the adhesion on the substrate. However, adding a plasticizer makes a distinct difference.

Powders according to Example 2 are used in Exp. No. 3-d and 3-e and powders according to Example 3 are used in Exp. No. 3-f and 3-g. They further demonstrate the powerful effect of the present invention. Thus, only 0.075 wt. % of a plasticizer mixture (e.g. Exp. No. 3-e) adsorbed on an even smaller amount of an inorganic carrier provides excellent adhesion to the substrate to give about full cohesion failure inside the substrate. Or, adding to the mortar only 0.2 wt. % of Powder 1 according to Example 3, representing only 0.086 wt % of plasticizer in the mortar (e.g. Exp. No. 3-g), provides a 100% pull-out after dry and wet storage, respectively.

We claim:

1. Process to adhere a mortar to a building substrate, the process comprising the steps of (A) mixing the mortar with at least one additive, (B) applying the mortar-additive mixture to a building substrate selected from the group consisting of polystyrene-containing substrates, polyolefin-containing substrates or polyvinyl chloride-containing substrates, and (C) allowing the mortar-additive mixture to dry, the additive comprising
   (i) a plasticizer that is liquid at 50° C. or lower, has a boiling point of 100° C. or higher, is capable of dissolving 1 wt % of the building substrate, and that has a solubility parameter δ at 25° C. between 22.5 MPa$^{1/2}$ and 11 MPa$^{1/2}$, the plasticizer being selected from esters,
   (ii) optionally, an inorganic filler that has a BET surface area of at least 40 m²/g;
   (iii) a polysaccharide selected from cold water-soluble polysaccharides, polysaccharide ethers, and synthetic anionic, nonionic and cationic heteropolysaccharides, the polysaccharide optionally being chemically modified with a substituent selected from the group consisting of carboxymethyl, carboxyethyl, hydroxyethyl, hydroxypropyl, methyl, ethyl, propyl, sulfate, phosphate and long chain alkyl groups; and/or
   (iv) a stabilizer selected from protective colloids; and
   wherein the additive is
   in the form of a liquid dispersion or powder obtained by mixing the plasticizer (i) with the polysaccharide (iii) and/or the stabilizer (iv) in pasty, swollen or dissolved form, optionally followed by drying said liquid dispersion, whereby the plasticizer (i) is not added to an aqueous dispersion containing a water-insoluble film-forming (co)polymer based on ethylenically unsaturated monomers, and
   wherein the additive is used in an amount of 0.005-5 percent by weight, based on the dry weight of the mortar, including the additive.

2. Process of claim 1, wherein the mortar is a dry mortar or contains a dry mortar component, the additive is added as a powder to the dry mortar or the dry mortar component, and the mortar is mixed with water and optional further liquid components prior to its application.

3. Process of claim 1, wherein the polysaccharide (iii) is used and wherein said polysaccharide (iii) is selected from the group consisting of cellulose ether, starch ether, guar ether, dextrine, alginate, xanthan gum, welan gum, and diutan gum.

4. Process of claim 3, wherein the stabilizer (iv) is used and wherein said stabilizer (iv) is a protective colloid and selected from the group consisting of fully or partially saponified polyvinyl alcohols and derivatives thereof, polyvinyl pyrrolidone, polyvinyl acetal, melamine formaldehyde sulfonates, naphthalene formaldehyde sulfonates, polymerizates of propylene oxide and/or ethylene oxide, including copolymerizates and block copolymerizates thereof, styrene-maleic acid and vinyl ether-maleic acid copolymerizates.

5. Process of claim 3, wherein a filler (ii) is used and wherein said filler (ii) is an inorganic material selected from the group consisting of latent hydraulic binders and pozzolanic materials.

6. Process of claim 3, wherein the amount of plasticizer (i) based on the total solids content in the mortar is between 0.01 and 2 wt %.

7. Process of claim 3, wherein the mortar contains one or more mineral binders selected from the group of a) an hydraulically setting binder, b) a latent hydraulic binder which reacts hydraulically in combination with a calcium source and c) a non-hydraulic binder which reacts under the influences of air and water.

8. Process of claim 1, wherein the stabilizer (iv) is used and wherein said stabilizer (iv) is a protective colloid and selected from the group consisting of fully or partially saponified polyvinyl alcohols and derivatives thereof, polyvinyl pyrrolidone, polyvinyl acetal, melamine formaldehyde sulfonates, naphthalene formaldehyde sulfonates, polymerizates of propylene oxide and/or ethylene oxide, including copolymerizates and block copolymerizates thereof, styrene-maleic acid and vinyl ether-maleic acid copolymerizates.

9. Process of claim 8, wherein a filler (ii) is used and wherein said filler (ii) is an inorganic material selected from the group consisting of latent hydraulic binders and pozzolanic materials.

10. Process of claim 8, wherein the amount of plasticizer (i) based on the total solids content in the mortar is between 0.01 and 2 wt %.

11. Process of claim 8, wherein the mortar contains one or more mineral binders selected from the group of a) an hydraulically setting binder, b) a latent hydraulic binder which reacts hydraulically in combination with a calcium source and c) a non-hydraulic binder which reacts under the influences of air and water.

12. Process of claim 1, wherein a filler (ii) is used and wherein said filler (ii) is an inorganic material selected from the group consisting of latent hydraulic binders and pozzolanic materials.

13. Process of claim 12, wherein the amount of plasticizer (i) based on the total solids content in the mortar is between 0.01 and 2 wt %.

14. Process of claim 12, wherein the mortar contains one or more mineral binders selected from the group of a) an hydraulically setting binder, b) a latent hydraulic binder which reacts hydraulically in combination with a calcium source and c) a non-hydraulic binder which reacts under the influences of air and water.

15. Process of claim 1, wherein the amount of plasticizer (i) based on the total solids content in the mortar is between 0.01 and 2 wt %.

16. Process of claim 15, wherein the mortar contains one or more mineral binders selected from the group of a) an hydraulically setting binder, b) a latent hydraulic binder which reacts hydraulically in combination with a calcium source and c) a non-hydraulic binder which reacts under the influences of air and water.

17. Process of claim 1, wherein the mortar contains one or more mineral binders selected from the group of a) an hydraulically setting binder, b) a latent hydraulic binder which reacts hydraulically in combination with a calcium source and c) a non-hydraulic binder which reacts under the influences of air and water.

18. Process of claim 1, wherein the polysaccharide when present is a cellulose ether.

19. Process of claim 1, wherein the stabilizer when present is a protective colloid.

* * * * *